UNITED STATES PATENT OFFICE 2,386,499

SUPPORTED CATALYSTS AND PROCESS FOR PREPARING SAME

James R. Owen, Bartlesville, Okla., assignor to Phillips Petroleum Company, a corporation of Delaware No Drawing. Application March 4, 1943, Serial No. 478,032

12 Claims. (Cl. 252—253)

This invention relates to the preparation and utilization of catalysts, more particularly, supported catalysts which have one or more metal oxides or metals as active constituents.

Catalysts comprising one or more metal oxides or metals supported on suitable carrier materials are used to promote many industrially important reactions, such as the following reactions for the conversion or treatment of hydrocarbons: hydrogenation, dehydrogenation, hydration to alcohols, dehydrocyclization, desulfurization, isomerization, dehydration of alcohols to olefins, and the like. In the past, the preparation of such supported catalysts has commonly involved either coprecipitation of the active ingredient and the supporting material (for example, alumina gel) or addition of the active metallic ingredient to the supporting material in the form of an aqueous solution of a salt which upon being heated decomposes to the desired metal oxide. In a particularly advantageous method described in the copending application of Glen H. Morey, Serial No. 359,295, filed October 1, 1940, which has issued as Patent No. 2,339,349, the active ingredient is added to the support in the form of a sol; the sol is then precipitated on or in the supporting material with an aqueous solution of an alkali, and the resulting supported hydrous oxide or hydroxide is dried. In the final precipitation, according to this method, an exceedingly voluminous precipitate of hydrous oxide may form in such quantities that some of it may ooze or creep from the pores of the support and, on drying, form a loose powder or "fines" disassociated or inadequately associated with the support. Furthermore, the formation of such a voluminous hydrous oxide may exert such a strong pressure within the support granules that a considerable fraction of these granules are split or broken apart, forming fines from the support itself. As a consequence, a substantial amount of catalytic material may be lost thereby. The finished catalyst, if it contains substantial amounts of fines, may produce undesirable packing and/or channeling in converters in which it is used. Fines are especially undesirable with supports that consist of manufactured pellets of uniform size and shape.

An object of this invention is to provide superior supported metal oxide or metal catalysts of high activity and long life and improved methods for their production.

A specific object of this invention is to provide a process for the preparation of supported catalysts which avoids disruption of support granules that may occur when precipitation of metal hydroxides or hydrous oxides on or in a porous carrier is practiced in the wet way.

Another specific object is to provide a process for the preparation of a supported catalyst having granules of uniform size and shape, predetermined by the size and shape of the granules of the supporting material, without the necessity for briquetting or pelleting subsequent to impregnation of the supporting material with the active ingredient.

Another specific object is to provide a process for the preparation of supported catalysts that contain more catalytic metal oxide material from one impregnation than that obtained when the oxide material is formed in the usual wet way.

Another specific object is to provide improved processes for the catalytic treatment and/or conversion of hydrocarbons.

Other objects and advantages of this invention, some of which are referred to specifically hereinafter, will be apparent from the following description and the appended claims.

In accordance with one specific embodiment of this invention, supported metal oxide catalysts of high activity and long life are advantageously prepared by impregnating a suitable difficultly fusible or refractory porous granular carrier or support with a hydrosol, prepared by adding to a concentrated solution of at least one polyvalent-metal salt of a monobasic acid a concentrated alkaline reagent in an amount within the range of approximately 60 per cent of the stoichiometric equivalent of the salt to that amount required to form a permanent hydroxide or hydrous oxide precipitate. The term "stoichiometric equivalent," as used herein, refers to that amount required stoichiometrically to convert the metal salt to metal hydroxide. The hydrosol is digested, if necessary, to peptize any temporary precipitate before impregnating the carrier therewith. The formation or precipitation of the desired metal oxide is completed in or on the carrier by a treatment with substantially anhydrous gaseous or liquid ammonia. It is advantageous to dry, partially or completely, the sol-impregnated carrier prior to treating it with anhydrous ammonia. Subsequent to precipitation with anhydrous ammonia, the catalyst may be agitated for a short time with a dilute alkaline solution, for example, 2 per cent potassium hydroxide, as described in the copending application of David G. Blaker, Serial No. 365,369, filed November 12, 1940, to remove or counteract undesirable acid residue.

In general, my invention is applicable to any supported metal oxide catalyst in which one or more of the metal oxide ingredients or constituents can be derived by precipitation as hydrous metal oxides or hydroxides from an aqueous solution of salts of the desired metals. In some instances, a concentrated solution of the desired salt or salts may be used directly for impregnating the carrier, without the preliminary formation of a hydrosol; but the preparation of the hydrosol is usually advantageous, especially for the preparation of catalysts comprising chromium oxide or similar oxides, such as those of trivalent and tetravalent metals capable of forming sols and/or gels. Because ammonium salts of monobasic acids are generally more readily volatilized than ammonium salts of polybasic acids, and because suitable hydrosols are more readily prepared from monobasic acids than from polybasic acids, salts of monobasic acids, such as acetic, hydrochloric, nitric, are generally more advantageous than those of polybasic acids. One manner of using my invention and of obtaining its useful and novel advantages will be evident from the following description and examples relative to the preparation of supported chromium oxide catalysts, which constitute preferred species and which are regarded herein as best exemplifying the invention.

In one method of practicing the invention, a concentrated hydrosol comprising trivalent chromium compounds is prepared in any convenient manner, for example, by melting or dissolving a salt, such as chromic acetate, chromic chloride, chromic nitrate, or the like, in its own water of crystallization or in a minimum quantity of water. A concentrated alkaline solution, preferably aqueous ammonia, is then added to the chromic salt solution in a proportion short of that required to form a permanent precipitate such as a proportion stoichiometrically equivalent to from approximately 50 to approximately 75 per cent of the chromium salt, and the resulting mixture is digested for a time sufficient to peptize or redissolve any precipitated hydrous chromium oxide or hydroxide or basic chromic salt. Among hydrated salts that, for preparation of hydrosols, may be dissolved in their own water of crystallization are nonahydrates, such as those of aluminum nitrate, chromic nitrate and ferric nitrate; and hexahydrates, such as those of cerous nitrate, cobalt nitrate, cupric nitrate, ferric chloride, ferric nitrate, lanthanum nitrate, magnesium nitrate, manganous nitrate, nickel nitrate, uranyl nitrate, zinc nitrate and the nitrates of many of the rare-earth metals. Any permanent precipitate which remains upon digestion of the hydrosol may be dissolved or peptized by the addition of a small proportion of a concentrated monobasic acid.

Another method, which is especially advantageous for obtaining a suitable chromium oxide hydrosol from relatively impure material, is as follows: A chromium-containing material, such as an inactive chromium oxide catalyst, is dissolved or extracted with hot sulfuric acid. The resulting solution or extract is then reduced or oxidized to convert the chromium to the trivalent form, if it is not already present as such, and an alkaline solution is thereafter added to precipitate hydrous chromium oxide. Excess liquid is decanted and the resulting precipitate is digested with a proportion of a monobasic acid, such as hydrochloric acid, nitric acid, and acetic acid, that is sufficent to peptize or redissolve the precipitate but preferably not more than that proportion stoichiometrically equivalent to about 50 per cent of the hydrous chromium oxide. Similar procedures may be employed for the preparation of hydrosols of other metal oxides or mixtures of metal oxides.

A porous carrier material, such as activated aluminum oxide, bauxite or silica gel, having granules of the desired size and shape, is impregnated with the hydrosol prepared by one of the foregoing or an equivalent method, and excess water is removed by filtration and/or evaporation. The support or carrier may, in general, be any granular porous material that is capable of withstanding elevated temperatures (up to about 700° C. or higher) and that is resistant to conditions which will prevail during revivification of the catalyst by an oxygen-containing gas at an elevated temperature or other influences which will be encountered in use. Particularly desirable carriers are minerals capable of withstanding dehydrogenation temperatures without mechanical failure and which possess not only high specific surface and porosity but also ready perviousness. Supports which have these characteristics are such as are obtained from hydrous minerals, especially hydrous crystalline minerals, such as gibbsite and gypsum, by heating them to drive out combined water, so that a pervious skeletal structure remains. Certain metamorphosed minerals, such as mica and its relatives and various clays having a somewhat stratified structure, such as bentonite and montmorillonite, may be used as supports; those having good porosity and perviousness may be readily selected by simple tests for these characteristics. Among suitable preferred carriers are alumina, bauxite, kieselguhr, magnesia, silica gel, thoria, and zirconia. These supports are not to be considered as being complete equivalents of each other: they may or may not possess catalytic activity of their own. Of these materials, alumina and bauxite are usually preferred, mainly because they are readily available in large quantities at low cost and are of substantially uniform quality. The carrier, in the form of granules of any desired size and shape, is preferably heated before use to a temperature of about 600° C., in order to expel volatile matter and to increase its porosity. Extraneous soluble or finely divided matter may be advantageously removed by washing with water; a preliminary chemical treatment, especially with a dilute acid or alkali solution, is also sometimes advantageous. A convenient carrier consists of generally cylindrical alumina pellets of approximately equal diameter and length, preferably approximately one-eighth or three-sixteenths of an inch in diameter and length. Alumina pellets of these characteristics having somewhat rounded ends are especially desirable, since they possess less tendency to produce packing and channeling in use.

Incorporation of the hydrosol on the carrier may be effected in various conventional ways. A simple method consists in pouring the hydrosol over the carrier, stirring the mass, and removing excess liquid by any convenient means, such as by decantation, filtration, or evaporation.

The concentration of the hydrosol is preferably adjusted prior to mixing with the carrier so that there is some excess of liquid over that required to completely saturate the carrier. This excess liquid aids in distributing the active ingredient uniformly over the carrier. However, the amount of liquid should not be so large that it prevents deposition of an appreciable proportion of the active ingredient, or interferes with or unduly prolongs the subsequent drying operation.

In corporation of the hydrosol in the carrier may be facilitated by the use of vacuum to remove gas from the granular support and also by maintaining a low pressure while mixing the granular support and the sol. Subsequent release of the vacuum causes the sol to be driven into the interstices of the support. Similarly, alternate heating and cooling may be used to effect incorporation of the catalytic material into the support. The impregnated granules may be partially or wholly dried and reimpregnated and coated as many times as desired, to increase the quantity of catalytic material incorporated with the carrier. Normally, however, one impregnation is sufficient if the subsequent procedure as detailed herein is followed.

The carrier granules may be of any desired size and shape. Granular particles within the range of 4 to 40 mesh are preferred. The size of the particles may be outside this preferred range, but if it is much smaller than 40 mesh, the mixture is preferably pelleted or briquetted or otherwise formed into composite granules, each consisting of several carrier granules impregnated with the hydrous metal oxide component. Such composite granules may be obtained, for example, by separating the mixture of carrier granules and metal oxide catalytic material from excess liquid, as by filtering, expressing the liquid by pressure, or the like, and breaking up the resulting cake into composite granules of suitable size. Other conventional methods for obtaining composite granules or pellets of the desired size may be used, however.

The proportion of active metal oxides to carrier in the catalyst may be varied widely. An active metal oxide content of from approximately 5 to approximately 50 per cent by weight of the final composite catalyst is generally preferred, but proportions outside of this range may be used if desired. For dehydrogenation catalysts the active metal oxide component usually consists of one or more oxides of one or more metals of the 3rd, 4th, 5th, and 6th groups of the periodic table. Oxides of metals of the 6th group are preferred, however, especially oxides of chromium, which are exceptionally active. If desired, several metal oxides may be used in combination; for example, one or more relatively less active, infusible, difficultly reducible oxides may be incorporated in the catalyst to stabilize it against thermal shock or to modify its action. For such purposes, alumina, zirconia, titania, thoria, silica, boric oxide, and magnesia are suitable. Such modifying or stabilizing materials may be introduced by incorporation of the corresponding salts in the original chromium-containing solution or sol prior to impregnation of the carrier therewith.

Among other specific metals which may be incorporated as oxides in various catalysts in accordance with my invention are the following: beryllium, iron, copper, lanthanum, manganese, nickel, rhodium, zinc, and rare earths. It is understood that metal oxide catalysts suitable for one purpose are frequently entirely unsuitable for some other purpose, and hence that the particular metals chosen in practicing my invention will depend upon the contemplated use of the resulting catalyst.

After impregnation of the carrier with the hydrosol and removal of excess liquid therefrom, the resulting sol-containing granules preferably are dried to the point of being visually dry. They may be dried, for example, in air at a temperature in the range of approximately 40° to 100° C. for a period of from approximately one hour to two or more days dependent upon the temperature. This drying step is not critical, its chief function being to facilitate handling of the material. However, if too much water is left in the material some oozing out or creeping of hydrous oxides and disruption of the carrier granules may occur in the final treatment with anhydrous ammonia. Since water dissolves in the anhydrous ammonia, it is desirable to remove as much water as possible from the impregnated carrier so as to simplify the subsequent recovery of ammonia in the process. In some instances, for example when the carrier is very porous or absorptive and the proportion of metal oxide is relatively small, the drying step may be omitted, but this is not generally desirable.

The dried or liquid-free supported sol is then subjected to the action of substantially anhydrous ammonia. The granules may be immersed in liquid ammonia for a time sufficient to complete the reaction of ammonia with the sol or salts in the catalyst. Preferably, however, because of the comparative difficulty and the refrigeration required in handling liquid ammonia, gaseous ammonia is used. Gaseous substantially anhydrous ammonia, which may be diluted, if desired, with other gases, such as methane, carbon dioxide, hydrogen, or nitrogen, is passed over the granules at a temperature which preferably is below approximately 100° C. A temperature much above 100° C. at the start of the ammonia treatment tends to make the catalytic metal oxides relatively less adherent to the support, apparently because of too rapid dehydration. After the ammonia treatment is partly completed, the temperature may usually be raised somewhat above 100° C. without detriment. The time of ammonia treatment has been found not to be critical and need only be long enough, such as 1 to 15 minutes or more, dependent upon the velocity and dilution of the ammonia, to complete the reaction between ammonia and the deposited metal salts. Some water is usually expelled because of heat evolved in the treatment. The progress of the reaction with gaseous ammonia may be followed advantageously by checking the temperature of the catalyst; the reaction is judged complete, and the flow of ammonia gas may be stopped, when the temperature in the catalyst drops again to the temperature of the surrounding atmosphere.

The resulting ammonia-treated catalyst material is dehydrated and reduced, as by heating gradually from room temperature up to approximately 450° C. in a stream of hydrogen or a hydrocarbon to effect the decomposition and removal of the ammonium salts. The ammonia liberated by this treatment is sometimes found to be more volatile than the acid which is concurrently freed. In consequence, the catalyst so prepared may contain acid residues which are undesirable because they appear to increase the carbon-forming tendency of the catalyst. Such acid residues may be removed or counteracted by treating the dried catalyst with dilute aqueous alkaline solutions, such as solutions of soluble alkali-metal or alkaline-earth-metal hydroxides or carbonates for a short time, decanting the excess alkaline solution, and redrying the catalyst.

The alkaline compound used for neutralizing the acid residues should be one which forms stable, relatively nonvolatile salts with acids, so that no volatilization of catalyst constituents occurs at the temperatures of use of the catalyst. The alkaline solutions used for this treatment are preferably dilute solutions which contain from approximately 0.1 to approximately 10.0 per cent by weight of the alkaline compound, and preferably such as contain from approximately 0.5 to approximately 5 per cent. The optimum concentration and amount of alkaline solution for use in a particular case may be readily determined by trial. Among alkalizing materials which may be used in this way are: sodium hydroxide, potassium hydroxide, rubidium hydroxide, strontium hydroxide, barium hydroxide, and sodium aluminate. The period of treating may vary widely; usually from 15 minutes to 24 hours is satisfactory.

To illustrate further some of the many aspects of my invention, the following specific examples are typical of the results obtained in the practice of the invention:

Example I

To a solution consisting of 400 grams of chromium nitrate $(Cr(NO_3)_3 \cdot 9H_2O)$ melted in its own water of crystallization, is added with stirring, 140 milliliters of 28 per cent aqueous ammonia solution. The precipitate which forms is thereafter completely peptized or redissolved by heating and digesting with stirring. The resulting hot sol is poured over 1000 grams of activated aluminum oxide pellets in an evacuated container, and the mixture is stirred until all or nearly all the sol is absorbed or deposited in and on the pellets. The sol-containing pellets are dried in air at a temperature of approximately 50° to 60° C. for 6 hours and are then placed in a glass tube. Substantially anhydrous gaseous ammonia is passed through the tube for about one hour. Heat is liberated during the first part of the one-hour period, and some moisture condenses at the exit end of the glass tube. None of the pellets are disrupted by such treatment.

This catalyst is used for dehydrogenating normal butane to butylenes as follows: It is placed in a catalyst chamber of a continuous dehydrogenation system and is heated slowly from room temperature to 550° C. in a stream of hydrogen. At 550° C., the flow of hydrogen is cut off, and a stream of normal butane is charged into the catalyst chamber at a space velocity of 1000 gaseous volumes per volume of catalyst per hour. The initial conversion per pass of normal butane to butylenes is 30 mol per cent; this conversion is maintained by gradual raising of the temperature to compensate for decreasing activity of the catalyst, until at the end of 3 hours the temperature is 620° C. The catalyst is then reactivated by passing a stream of air over it for one hour; during this time the maximum temperature reached is 700° C. The reactivated catalyst is reduced by passing a stream of hydrogen through it at 550° C., and the flow of normal butane is started again. The catalyst is used in this way for 10 cycles and shows no apparent permanent decrease in activity.

Example II

A catalyst prepared as described in Example I is used as follows: It is gradualy heated from room temperature to 520° C. in a stream of hydrogen. At 520° C., flow of normal butane is begun. The initial conversion of normal butane to butylenes is 18 per cent; this conversion is maintained by gradual increase of the temperature to compensate for decrease in catalyst activity. After 15 hours the conversion temperature is 600° C. The catalyst is regenerated by burning out with air, and is reduced in hydrogen at 520° C. The reduced catalyst is used for a second cycle in which it gives results that are substantially identical with those obtained in the first cycle, that is, it is used for 15 hours at a constant conversion of 18 per cent between the temperatures of 520° and 600° C.

Example III

To a solution consisting of 400 grams of chromium nitrate $(Cr(NO_3)_3 \cdot 9H_2O)$ and 112 grams of aluminum nitrate $(Al(NO_3)_3 \cdot 9H_2O)$ melted and dissolved in their own water of crystallization, is added slowly, with stirring, 140 milliliters of 28 per cent aqueous ammonia solution. The mixture is heated and digested with stirring until the precipitate, which formed upon addition of the ammonia, is completely peptized or redissolved. The hot sol is then poured onto 1000 grams of activated aluminum oxide pellets, and sufficient hot water is added so that the diluted sol completely covers the pellets. The mixture is placed under a pressure of 2 to 3 atmospheres of nitrogen and is allowed to stand for 12 hours. The excess water is then removed by subjecting the mixture, heated to 60° to 70° C., to evacuation. The sol-containing pellets are then placed in a glass tube, and substantially anhydrous gaseous ammonia, diluted with 9 parts by volume of nitrogen, is slowly passed over them for 10 hours. The heat liberated is not as evident as in Example I. At the end of the ten-hour period, the catalyst-containing pellets are removed from the tube. None of the pellets has cracked or burst during the treatment. The catalyst is used for dehydrogenation as described in Example I, and substantially the same results are obtained.

Example IV

To a heated solution of 400 grams of chromium nitrate $(Cr(NO_3)_3 \cdot 9H_2O)$, 33 grams of zirconyl nitrate $(ZrO(NO_3)_2 \cdot 2H_2O)$, 48 grams of magnesium nitrate $(Mg(NO_3)_2 \cdot 6H_2O)$, and 100 milliliters of distilled water are slowly added with stirring 140 milliliters of 28 per cent aqueous ammonia solution. The mixture is digested until the precipitate, which formed upon addition of the ammonia solution, is completely redissolved. The resulting sol is then diluted with sufficient hot distilled water to cover completely 1000 grams of activated aluminum oxide pellets, and is poured onto this quantity of these pellets in an evacuated container. The mixture is stirred for one hour, and the excess water is then removed by subjecting the mixture, heated to a temperature of approximately 60° to 70° C., to evacuation. The partly dried sol-containing pellets are then placed in a vessel surrounded by a bath at a temperature of —80° C., and anhydrous liquid ammonia is added slowly until the pellets are completely covered. The mixture is allowed to stand for 30 minutes, the ammonia is allowed to evaporate, and the pellets are removed from the vessel. The pellets are found to have substantially the size and shape of the original unimpregnated carrier material, none having cracked or burst during the treatment. When used to dehydrogenate normal butane, the same procedure is used, and substantially the same results are obtained, as in Example I.

Comparative results

1. A hydrosol was prepared by adding 67 per cent of the stoichiometrically equivalent amount of ammonia to the nitrates of chromium and aluminum in the weight ratio of chromium oxide to aluminum oxide of 5:1. Eleven parts by weight of alumina pellets were impregnated with the hydrosol in the manner described in Example I. When an attempt was made to complete the precipitation of the hydrogels by the addition of aqueous ammonia containing 0.0066 gram of ammonia per cubic centimeter of solution, only 23.5 per cent of the gel which was formed remained in and on the support. The use of more concentrated ammonia water (0.0315 gram of ammonia per cubic centimeter of solution) caused a slightly greater amount of the precipitated gel to remain in the pellets, but about one-tenth of the pellets were burst by the gel which formed in the pores of the support.

2. A hydrosol was prepared by adding 67 per cent of the stoichiometrically equivalent amount of ammonia to the nitrates of chromium and magnesium in the weight ratio of chromium oxide to magnesium oxide of 10:1, and it was supported on twelve parts by weight of alumina pellets in the manner described in Example I. When an attempt was made to complete the precipitation of the hydrogels by the addition of aqueous ammonia containing 0.0048 gram of ammonia per cubic centimeter of solution, only 18.8 per cent of the gel which was formed remained in and on the support.

In the foregoing examples, the utilization of catalysts prepared according to the process of this invention has been confined to the dehydrogenation of butane for the sake of making direct comparisons of catalyst behavior. However, many catalysts prepared according to the process of the invention are equally applicable to dehydrogenation of other paraffin hydrocarbons, from ethane through the waxes, to form the corresponding olefins; to dehydrogenation of olefins to the corresponding diolefins; and to other reactions known to be promoted by the type of catalyst concerned.

From the foregoing description and examples, it will be apparent to those skilled in the art of preparing catalysts, that the use of anhydrous ammonia as a precipitating agent to prepare an active supported metal oxide catalyst from a metal hydrous oxide-impregnated supporting material is a distinct advance over former methods, which are characterized by the use of an aqueous alkaline solution as the final precipitating agent.

When an aqueous alkaline solution is used in the final precipitating treatment, many carrier granules are cracked or disrupted, apparently because of the formation within the granules of a voluminous hydrous oxide gel. Furthermore, close examination of the catalyst so prepared shows that much of the gel is extruded through pores and cracks in the granules. On the contrary, when substantially anhydrous ammonia is used as a final precipitating agent in accordance with the principles of this invention, the carrier granules are not cracked or disrupted, presumably because in the substantial absence of water the precipitate formed within the granules is comparatively "nonvoluminous"; furthermore, relatively all of the active catalytic component remains in and on the carrier granules, so that loss by extrusion and formation of undesirable "fines" is avoided.

Although the processes described hereinabove are directed to the production of catalysts comprising one or more metal oxides, it is obvious that one or more particular metal oxide components of said catalysts can be reduced, and in many hydrocarbon conversion reactions may actually be so reduced, to the corresponding metals. Thus the invention is directed to the production of supported catalysts in which the supported catalytic material comprises initially a metal oxide which may be converted subsequently, wholly or partially, to a metal.

There are many modifications of my invention that will be obvious to those skilled in the art of catalysis and catalyst preparation. For example, although for the sake of clarity and simplicity the foregoing description has dealt mainly with dehydrogenation-type catalysts which comprises chromium oxide, the invention is applicable generally to supported catalysts in which one or more of the active ingredients are metal oxides derivable from solutions or hydrosols by precipitation or reaction with ammonia and is applicable to reactions other than dehydrogenation, such as aromatization, isomerization, desulfurization, etc., that are well-known in the art of treating and/or converting hydrocarbons or other organic compounds. Some of these reactions, such as hydrogenation, dehydrogenation, dehydrocyclization, and the like, when applied to hydrocarbons, may be grouped together under the term of changing the carbon-hydrogen ratio of hydrocarbons. Hence, the invention should not be restricted except as specified in the appended claims.

I claim:

1. In the process of preparing a catalyst comprising a metal oxide supported on a porous catalyst carrier material which comprises impregnating the porous catalyst carrier material with a hydrosol comprising a compound of a metal selected from groups 3 to 6, inclusive, of the periodic table that is capable of yielding by reaction with alkalies a catalytically active metal oxide and thereafter precipitating the catalytically active metal oxide on the impregnated carrier material with an alkali, the improvement whereby the metal oxide is precipitated upon the carrier material without substantial disruption of the catalyst carrier material and without the formation of a substantial amount of fines, which comprises impregnating the catalyst carrier material with the hydrosol comprising the said metal compound, removing a substantial portion of the excess liquid therefrom, partially but incompletely drying said impregnated catalyst carrier material at a temperature below approximately 100° C., and subsequently passing substantially anhydrous ammonia over the partially dried impregnated material to effect precipitation of the metal oxide upon the carrier material and thereafter heating the resulting material to remove water and ammonium compounds therefrom.

2. The process as defined in claim 1, in which said aqueous medium is a sol prepared by adding to a concentrated solution of at least one polyvalent metal salt of a monobasic acid a concentrated ammonia solution in an amount within the range of approximately 50 per cent of the stoichiometrical equivalent of said salt to that amount required to form a permanent precipitate, and digesting until any temporary precipitate is peptized.

3. The process as defined in claim 1, in which said metal is a metal having a valence of three to four.

4. The process as defined in claim 1, in which said metal is chromium.

5. The process as defined in claim 1, in which said ammonia is in the gaseous state.

6. The process as defined in claim 1, in which said ammonia is gaseous and is diluted with an inert gas.

7. The process as defined in claim 1, in which said ammonia is in the liquid state.

8. The process as defined in claim 1, in which the resulting ammonia-treated catalytic material is subsequently treated with an alkalizing solution comprising a substantially nonvolatile alkaline compound that forms substantially nonvolatile salts with acids, in an amount at least sufficient to combine with any residual acidic decomposition products formed in said ammonia treatment.

9. In the process of preparing a catalyst comprising a metal oxide supported on a porous catalyst carrier material which comprises impregnating the porous catalyst carrier material with a hydrosol prepared by the addition of ammonia to a salt of a monobasic acid and a polyvalent metal selected from groups 3 to 6, inclusive, of the periodic table that is capable of yielding by reaction with alkalies a catalytically active metal oxide and thereafter precipitating the catalytically active metal oxide on the impregnated carrier material with an alkali, the improvement whereby the metal oxide is precipitated upon the carrier material without substantial disruption of the catalyst carrier material and without the formation of a substantial amount of fines, which comprises impregnating the catalyst carrier material with the hydrosol comprising the said metal compound, removing a substantial portion of the excess liquid therefrom, partially but incompletely drying said impregnated catalyst carrier material at a temperature below approximately 100° C., and subsequently passing substantially anhydrous ammonia over the partially dried impregnated material to effect precipitation of the metal oxide upon the carrier material and thereafter heating the resulting material to remove water and ammonium compounds therefrom.

10. A process of preparing a catalyst comprising chromium oxide supported on a porous granular catalyst carrier material which comprises impregnating the porous granular catalyst carrier with a hydrosol prepared from a water-soluble chromium compound, and thereafter removing a substantial portion of the excess liquid therefrom, partially but incompletely drying said impregnated catalyst carrier material at a temperature within the range of approximately 40° to approximately 100° C., and subsequently passing substantially anhydrous ammonia over the partially dried impregnated catalyst carrier at a temperature below approximately 100° C. to effect precipitation of chromium oxide on the carrier material.

11. A process of preparing a catalyst comprising chromium oxide supported on a porous granular catalyst carrier material which comprises forming a hydrosol by the addition of a concentrated aqueous ammonia solution to a concentrated aqueous solution of a water-soluble chromium salt of a monobasic acid in an amount within the range of approximately 50 per cent of the stoichiometrical equivalent of said salt to that amount required to form a permanent precipitate, impregnating the porous granular catalyst carrier material with said hydrosol and thereafter removing a substantial portion of the excess liquid therefrom, partially but incompletely drying said impregnated catalyst carrier at a temperature within the range of approximately 40° to approximately 100° C., and subsequently passing substantially anhydrous ammonia over the partially dried impregnated catalyst carrier at a temperature below approximately 100° C. to effect precipitation of chromium oxide on the carrier material.

12. A process of preparing a catalyst comprising chromium oxide and aluminum oxide supported on a porous granular aluminum oxide carrier material, which comprises forming a hydrosol by the addition of a concentrated aqueous ammonia solution to a concentrated aqueous solution of a mixture of water-soluble chromium and aluminum salts of monobasic acids in an amount within the range of approximately 50 per cent of the stoichiometrical equivalent of said salts to that amount required to form a permanent precipitate, impregnating the porous granular catalyst material with said hydrosol and thereafter removing a substantial portion of the excess liquid therefrom, partially but incompletely drying said impregnated catalyst carrier at a temperature within the range of approximately 40° to approximately 100° C., and subsequently passing substantially anhydrous ammonia over the partially dried impregnated catalyst carrier at a temperature below approximately 100° C. to effect precipitation of chromium and aluminum oxides on the carrier material.

JAMES R. OWEN.